(12) United States Patent
Lee

(10) Patent No.: US 9,170,370 B2
(45) Date of Patent: Oct. 27, 2015

(54) OPTICAL PRINTED CIRCUIT BOARD, APPARATUS AND METHOD FOR MANUFACTURING SAME

(75) Inventor: Bing-Heng Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 490 days.

(21) Appl. No.: 13/584,762

(22) Filed: Aug. 13, 2012

(65) Prior Publication Data

US 2013/0230277 A1 Sep. 5, 2013

(30) Foreign Application Priority Data

Mar. 2, 2012 (TW) .............................. 101107006 A

(51) Int. Cl.
*G02B 6/12* (2006.01)
*G02B 6/42* (2006.01)
*G02B 6/43* (2006.01)

(52) U.S. Cl.
CPC .......... *G02B 6/12002* (2013.01); *G02B 6/4214* (2013.01); *G02B 6/43* (2013.01)

(58) Field of Classification Search
None
See application file for complete search history.

(56) References Cited

U.S. PATENT DOCUMENTS

2004/0012978 A1* 1/2004 Doi .............................. 362/551
2004/0234224 A1* 11/2004 Ishizaki et al. ................ 385/129
2009/0297096 A1* 12/2009 Hodono ........................ 385/14

* cited by examiner

*Primary Examiner* — Sarah U Song
(74) *Attorney, Agent, or Firm* — Novak Druce Connolly Bove + Quigg LLP

(57) ABSTRACT

An optical printed circuit board includes a substrate, a first cladding layer, a core layer, and a second cladding layer. The first cladding layer is formed on the substrate and defines a receiving groove. The core layer is received in the receiving groove. The second cladding layer is formed on the core layer. The refractive index of the core layer is greater than that of the first cladding layer and that of the second cladding layer. The core layer includes a bottom surface, a first refractive surface, and a second refractive surface. An included angle between the bottom surface and the first refractive surface is about 135 degrees. An included angle between the bottom surface and the second refractive surface is about 135 degrees.

5 Claims, 11 Drawing Sheets

OPTICAL PRINTED CIRCUIT BOARD, APPARATUS AND METHOD FOR MANUFACTURING SAME

BACKGROUND

1. Technical Field

The present disclosure relates to an optical printed circuit board (OPCB), an apparatus and a method for manufacturing the OPCB.

2. Description of Related Art

OPCBs include a cladding layer and a core layer received in the cladding layer. The core layer is used for transmitting optical signals. In related art, the core layer needs to be manually assembled in the cladding layer, which will reduce the manufacturing efficiency of the OPCBs.

Therefore, it is desirable to provide an OPCB, an apparatus and a method for manufacturing the OPCB that can overcome the above-mentioned limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
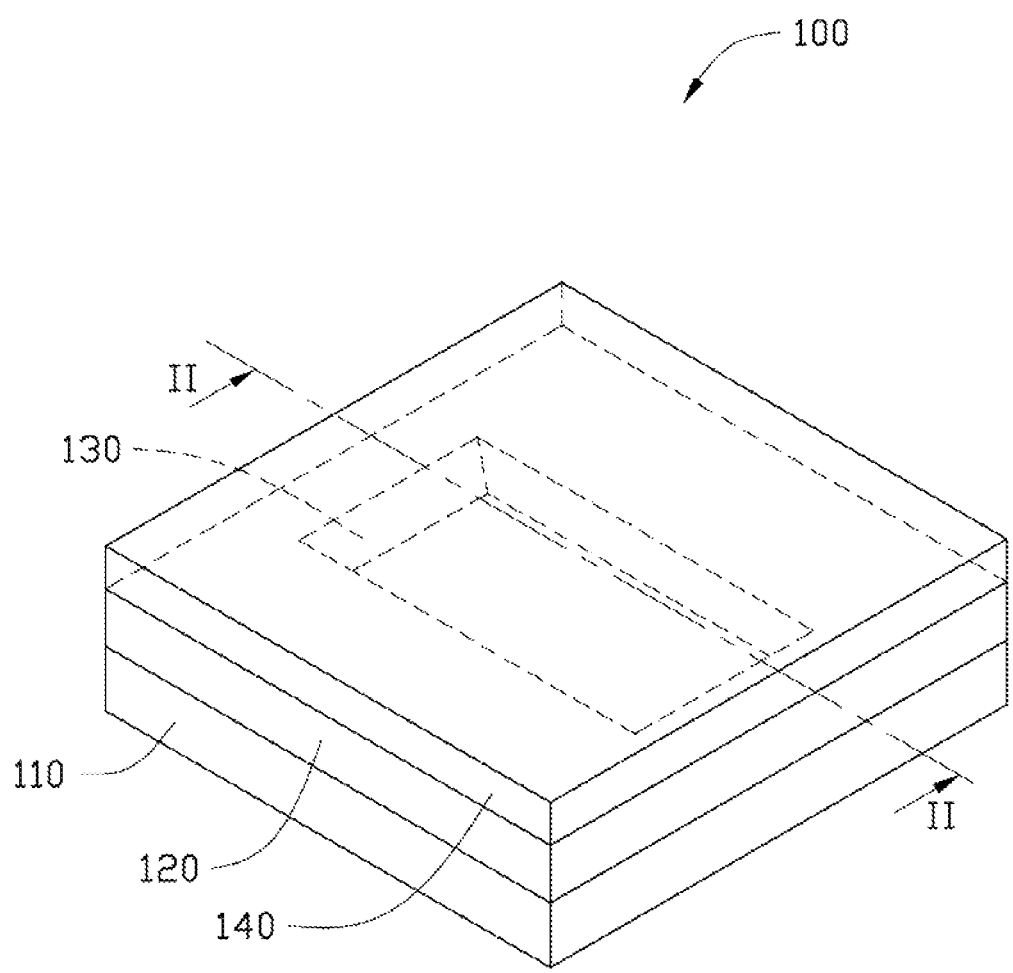
FIG. 1 is a schematic view of an OPCB, according to a first exemplary embodiment.
Figure 2:
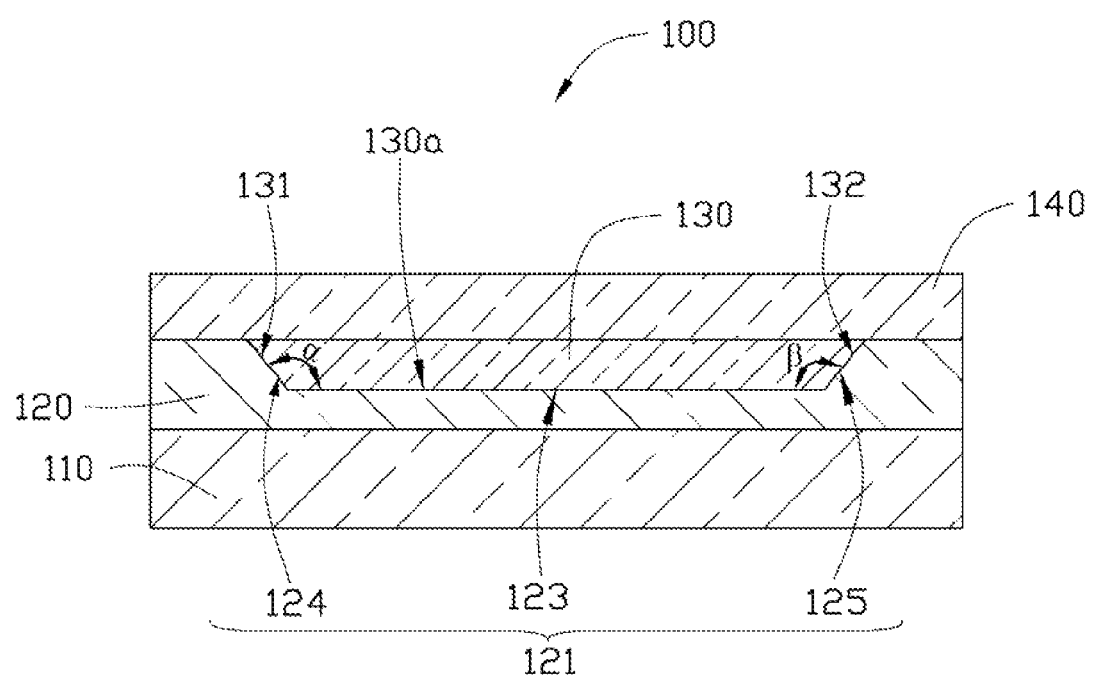
FIG. 2 is a cross-sectional view of the OPCB, taken along a line II-II of FIG. 1.

FIG. 1 and FIG. 2 illustrate an OPCB 100 in accordance with a first embodiment. The OPCB 100 includes a substrate 110, a first cladding layer 120, a core layer 130, and a second cladding layer 140. The first cladding layer 120, the core layer 130, and the second cladding layer 140 are made of transparent material.

The first cladding layer 120 is formed on the substrate 110 and defines a receiving groove 121. The receiving groove 121 has a loading surface 123, a first inclined surface 124, and a second inclined surface 125. The first inclined surface 124 and the second inclined surface 125 are positioned at opposite ends of the loading surface 123. The included angle between the first inclined surface 124 and the loading surface 123 is about 135 degrees. The included angle between the second inclined surface 125 and the loading surface 123 is also about 135 degrees.

The core layer 130 is received in the receiving groove 121. In this embodiment, the core layer 130 is coupled with the receiving groove 121 and includes a bottom surface 130a, a first reflecting surface 131, and a second reflecting surface 132. The second reflecting surface 132 and the first reflecting surface 131 are positioned at opposite ends of the bottom surface 130a. The included angle α between the first reflecting surface 131 and the bottom surface 130a is about 135 degrees. The included angle β between the second reflecting surface 132 and the bottom surface 130a is also about 135 degrees. The bottom surface 130a is in contact with the loading surface 123. The first reflecting surface 131 is in contact with the first inclined surface 124. The second reflecting surface 132 is in contact with the second inclined surface 125.

The second cladding layer 140 is formed on the core layer 130 and cooperates with the first cladding layer 120 to seal the core layer 130 therebetween.

The first cladding layer 120 and the second cladding layer 140 are made of low refractive index material, such as the following materials without light sensitive groups: polyacrylate, polysiloxane, polyimide, polycarbonate, fluorinated polymer, or mixture of at least two above materials. In this embodiment, the material of the first cladding layer 120 is the same as the material of the second cladding layer 140. In another embodiment, the material of the first cladding layer 120 is different from the material of the second cladding layer 140.

The refractive index of the core layer 130 is greater than the refractive index of the first cladding layer 120 and the refractive index of the second cladding layer 140. The core layer 130 is made of high refractive index material, such as the following materials with light sensitive groups: polyacrylate, polysiloxane, polyimide, polycarbonate, fluorinated polymer, or mixture of at least two above materials.

In use, a light emitting module (not shown) and a light receiving module (not shown) are positioned on a surface of the second cladding layer 140 away from the substrate 110, and these are respectively aligned with the first reflecting surface 131 and the second reflecting surface 132. Optical signals from the light emitting module pass through the second cladding layer 140, then enter the core layer 130, and are reflected by the first reflecting surface 131 and the second reflecting surface 132, and then enter the second cladding layer 140 again, at last being received by the light receiving module.

Figure 3:
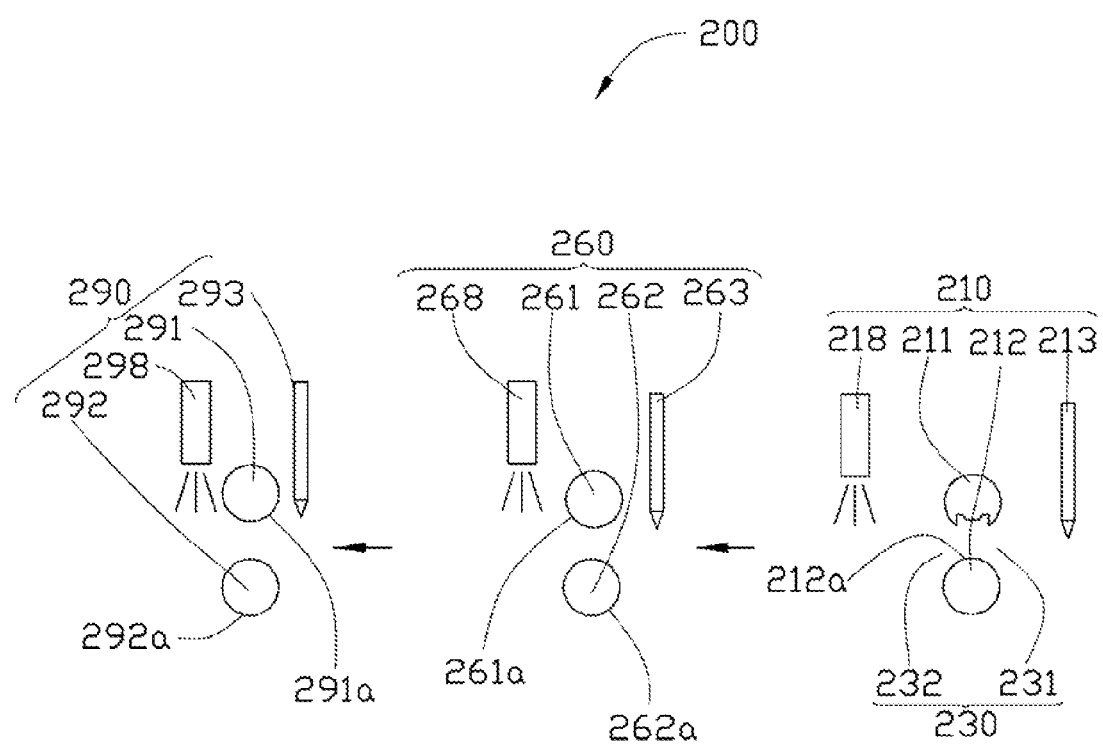
FIG. 3 is a schematic view of an apparatus for manufacturing the OPCB of FIG. 1, wherein the apparatus includes a first pressing roller.

Referring to FIG. 3, an apparatus 200 for manufacturing the OPCB 100 includes a first roller pressing device 210, a second roller pressing device 260, and a third roller pressing device 290.

Figure 4:
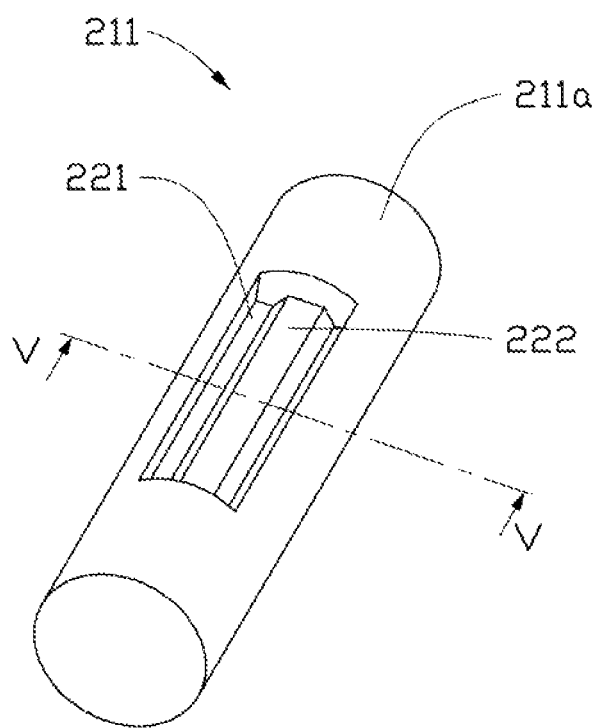
FIG. 4 is a schematic view of the first pressing roller of the apparatus of FIG. 3.
Figure 5:
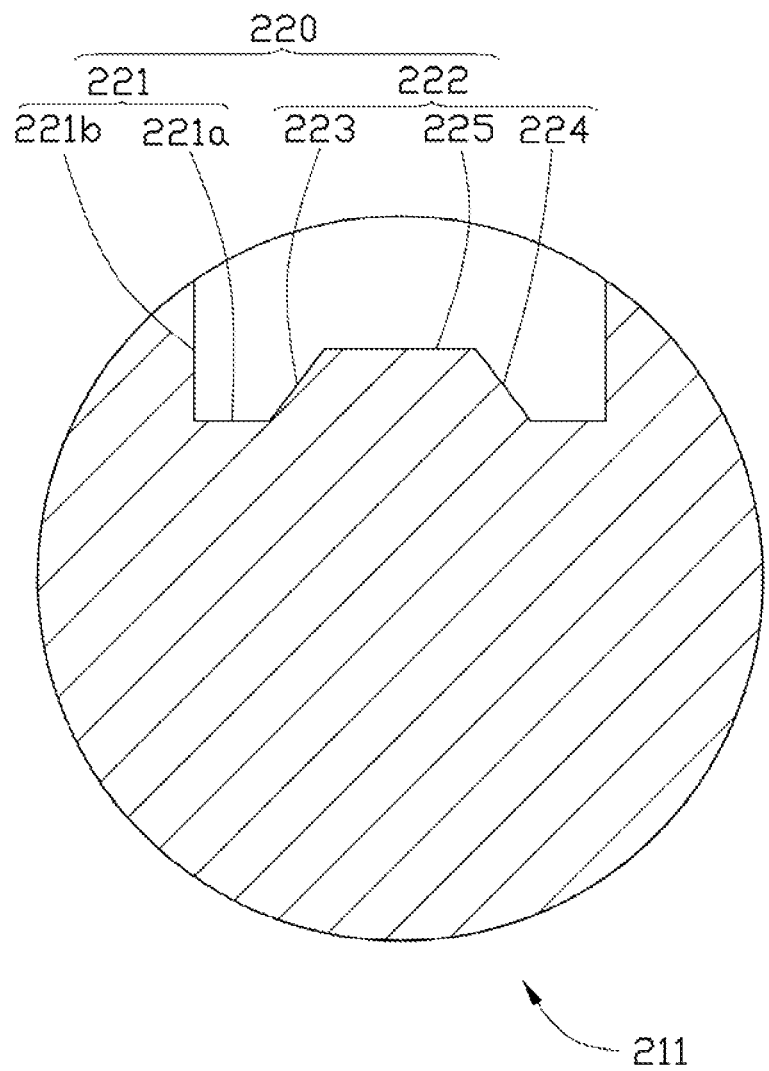
FIG. 5 is a cross-sectional view of the first pressing roller, taken along a line V-V of FIG. 4.

The first roller pressing device 210 is used for forming a first cladding layer 120 with the receiving groove 121 on the substrate 110, and includes a first pressing roller 211, a first auxiliary roller 212, a first feeder 213, and a first drying element 218. Referring also to FIGS. 4&5, a rolling surface 211a of the first pressing roller 211 carries a master first impression pattern 220 to impress a shape matching that of the receiving groove 121. The first impression pattern 220 includes a first molding groove 221 and a first protrusion 222. The first molding groove 221 has a first molding surface 221a and two opposite second molding surfaces 221b. The first molding surface 221a is perpendicularly connected to the two second surfaces 221b. The first protrusion 222 is positioned on the middle of the first molding surface 221a, and has a first side surface 223, a second side surface 224, and a connecting surface 225. The second side surface 224 is opposite to the first side surface 223. The connecting surface 225 is connected to the first side surface 223 and the second side surface 224, and is substantially parallel to the first molding surface 221a. An included angle of the first side surface 223 and the connecting surface 225 is about 135 degrees. An included angle of the second side surface 224 and the connecting surface 225 is also about 135 degrees. In other embodiments, the two second molding surfaces 221b can be other than perpendicular to the first molding surface 221a, and the connecting surface 225 can be other than parallel to the first molding surface 221a.

The first auxiliary roller 212 has a smooth outer rolling surface 212a. The first auxiliary roller 212 is under the first pressing roller 211, and is at a predetermined distance from the first pressing roller 211 to form a molding channel 230. The molding channel 230 has an inlet 231 and an outlet 232. The substrate 110 enters the molding channel 230 from the inlet 231, and leaves the molding channel 230 through the outlet 232. The first feeder 213 is used for feeding a first cladding layer forming solvent to the substrate 110. The first cladding layer forming solvent is a solvent for forming the first cladding layer 120.

The first pressing roller 211 and the first auxiliary roller 212 rotate in opposite directions, and cooperate to press the substrate 110 to form a first cladding solvent layer with a receiving groove 121. The first cladding solvent layer is a layer of the first cladding layer forming solvent. In this embodiment, the first pressing roller 211 is rotated clockwise, and the first auxiliary roller 212 is rotated counterclockwise.

The first drying element 218 is used for solidifying the first cladding solvent layer to obtain a first cladding layer 120.

The second roller pressing device 260 is used for filling a core layer forming solvent in the receiving groove 121. The core layer forming solvent is a solvent for forming the core layer 130. The second roller pressing device 260 is slightly different from the first roller pressing device 210, and includes a second pressing roller 261, a second auxiliary roller 262, a second feeder 263, and a second drying element 268. The second auxiliary roller 262 has a smooth rolling surface 262a. The difference between the second roller pressing device 260 and the first roller pressing device 210 is that the second pressing roller 261 has a smooth rolling surface 261a.

The third roller pressing device 290 forms a second cladding layer 140 on the core layer 130. The third roller pressing device 290 is slightly different from the first roller pressing device 210, and includes a third pressing roller 291, a third auxiliary roller 292, a third feeder 293, and a third drying element 298. The third auxiliary roller 292 has a smooth rolling surface 292a. The difference between the third roller pressing device 290 and the first roller pressing device 210 is that the third pressing roller 291 has a smooth rolling surface 291a.

The direction of movement of the substrate 110 is substantially along its length. The distance between the first pressing roller 211 and the second pressing roller 261, and the distance between the second pressing roller 261 and the third pressing roller 291 are less than the length of the substrate 110. The first auxiliary roller 212, the second auxiliary roller 262, and the third auxiliary roller 292 are at a same height, therefore the substrate 110 can move from the first pressing device 210 to the second pressing device 260, then automatically enter the third pressing device 290. In this embodiment, the distance between the first pressing roller 211 and second pressing roller 261 is substantially equal to the distance between the second pressing roller 261 and the third pressing roller 291.

Figure 6:
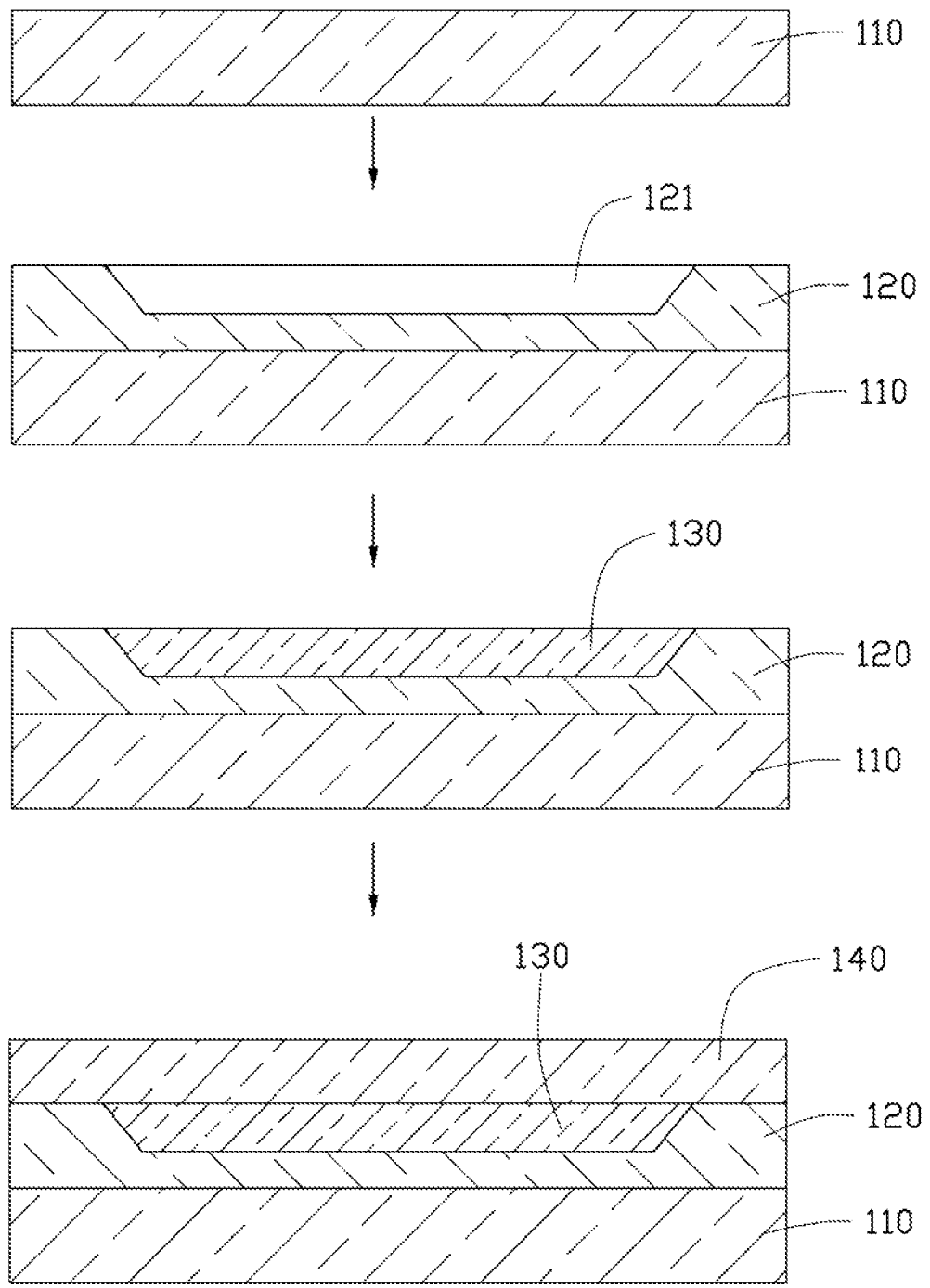
FIG. 6 is a schematic view showing successive stages of a method for manufacturing the OPCB of FIG. 1.

Referring to FIG. 6, a method for manufacturing the OPCB 100 using the apparatus 200 includes the following steps.

In step 1, the substrate 110 is provided and is cleaned.

In step 2, the first cladding layer 120 is formed on the substrate 110 using the first roller pressing device 210, the first cladding layer 120 defines the receiving groove 121.

In step 3, the receiving groove 121 is filled with the core layer forming solvent using the second pressing roller 260, the core layer 130 is thus obtained.

In step 4, a second cladding layer 290 is formed on the core layer 130 using the third roller pressing device 290, thus the OPCB 100 is obtained.

Figure 7:
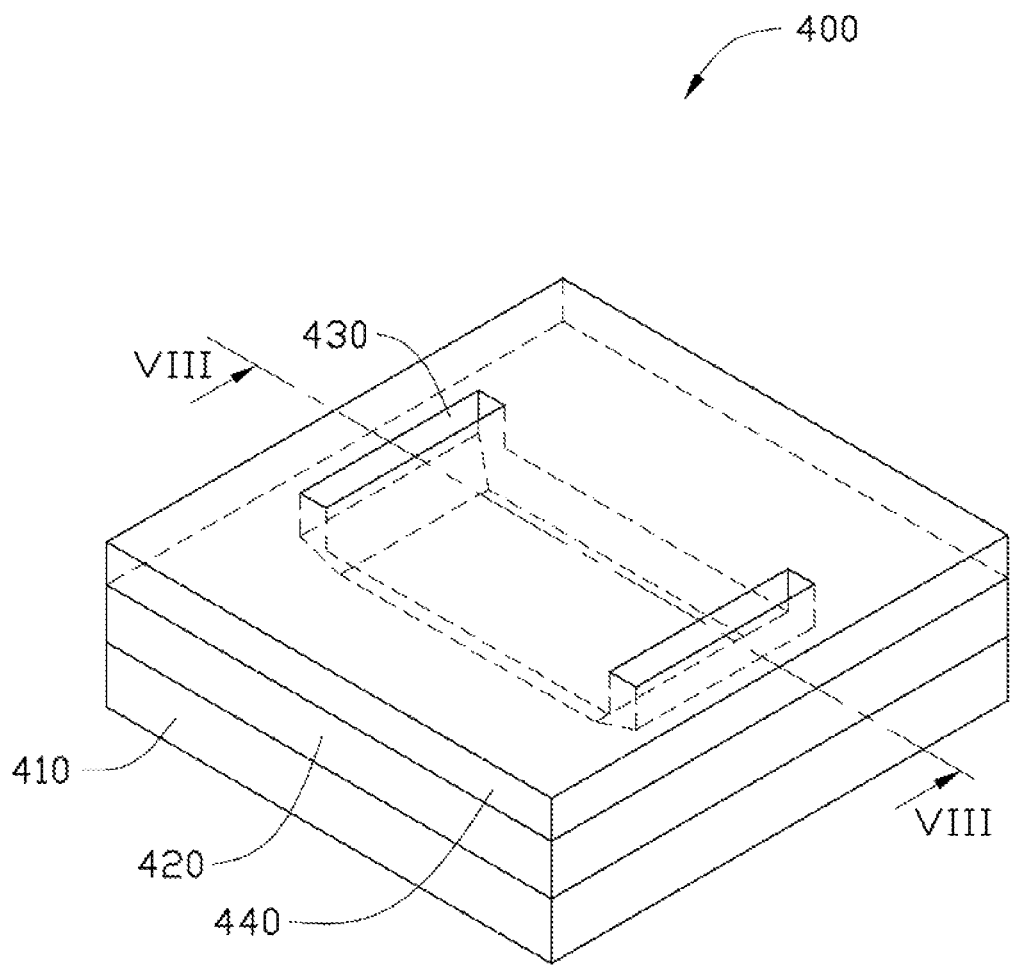
FIG. 7 is a schematic view of an OPCB, according to a second exemplary embodiment.
Figure 8:
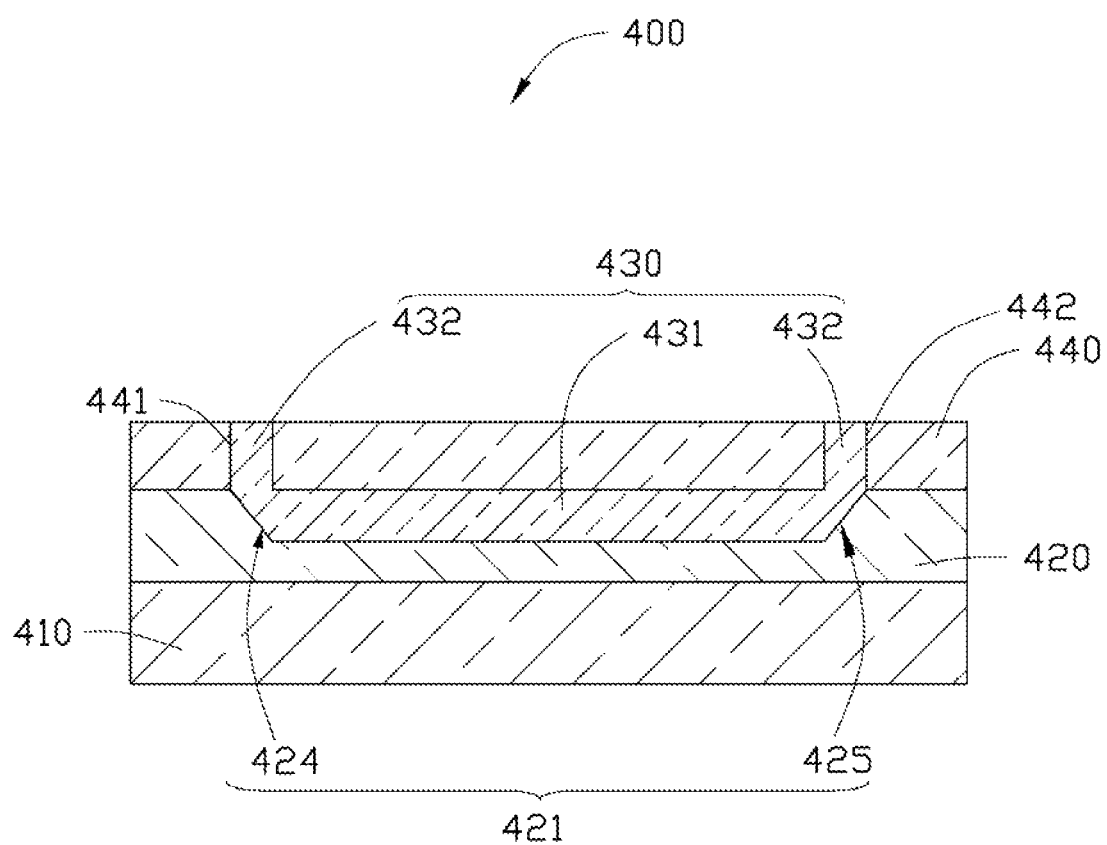
FIG. 8 is a cross-sectional view of the OPCB taken along a line VIII-VIII of FIG. 7.

Referring to FIGS. 7&8, an OPCB 400 of a second exemplary embodiment is slightly different from the OPCB 100. The OPCB 400 includes a substrate 410, a first cladding layer 420, a core layer 430, and a second cladding layer 440. The first cladding layer 420 defines a receiving groove 421 that is substantially the same as the receiving groove 121. The receiving groove 421 has a first inclined surface 424 and a second inclined surface 425. The difference between the OPCB 400 and the OPCB 100 is that the shape of the core layer 430 is different from the shape of the core layer 130, and the shape of the second cladding layer 440 is different from the shape of the second cladding layer 140.

The second cladding layer 440 defines a first channel 441 and a second channel 442 communicating with the receiving groove 421. The first channel 441 and the second channel 442 are substantially cuboid, and extend through the second cladding layer 440. The orthogonal projection of the first inclined surface 424 on the first cladding layer 420 is superposed on the first channel 441, and the orthogonal projection of the second inclined surface 425 on the first cladding layer 420 is superposed on the second channel 442. The receiving groove 421, the first channel 441, and the second channel 442 are filled with the core layer 430. That is, the core layer 430 includes a base 431 and two second protrusions 432 perpendicularly extending from the base 431. The base 431 is received in the receiving groove 421, and each second protrusion 432 is received in a respective one of the first channel 441 and the second channel 442.

Figure 9:
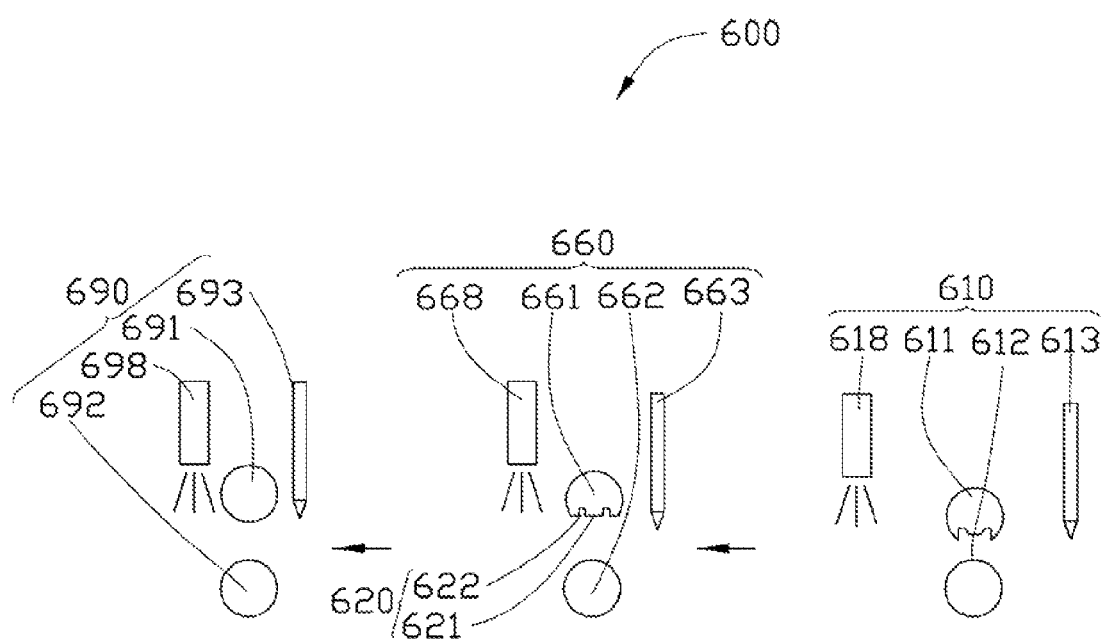
FIG. 9 is a schematic view of an apparatus for manufacturing the OPCB of FIG. 7, wherein the apparatus includes a second pressing roller.
Figure 10:
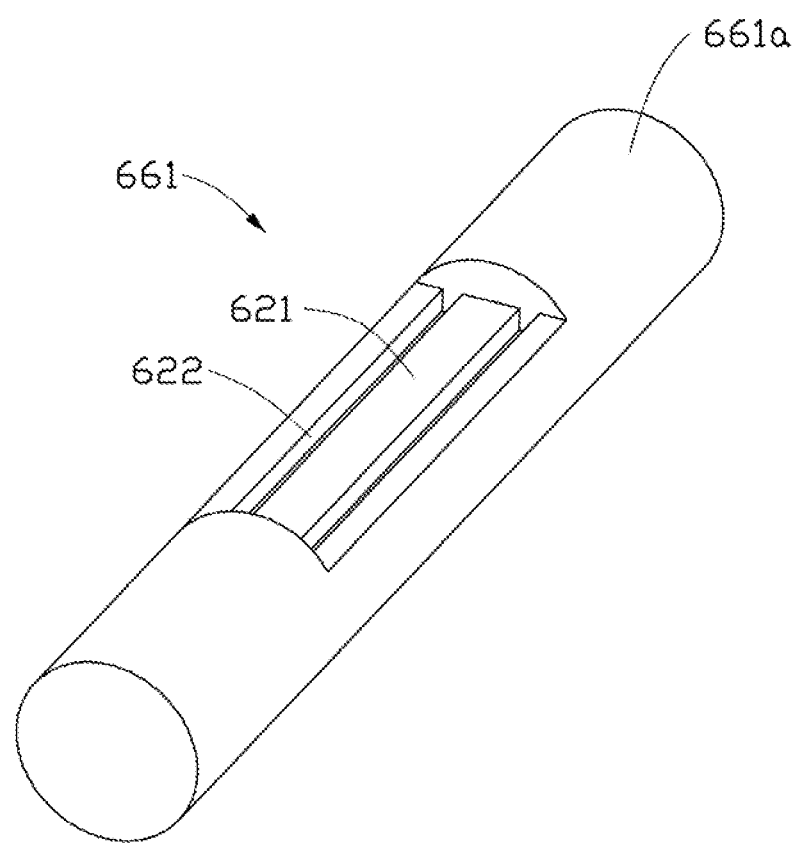
FIG. 10 is a schematic view of the second pressing roller of the OPCB of FIG. 9.

Referring to FIGS. 9 and 10, an apparatus 600 for manufacturing the OPCB 400 includes a first roller pressing device 610, a second roller pressing device 660, and a third roller pressing device 690. The structure of the first roller pressing device 610 is substantially the same as the structure of the first roller pressing device 210. The first roller pressing device 610 includes a first pressing roller 611, a first auxiliary roller 612, a first feeder 613, and a first drying element 618. The second roller pressing device 660 includes a second pressing roller 661, a second auxiliary roller 662, a second feeder 663, and a second drying element 668. The difference between the second roller pressing device 661 and the second roller pressing device 260 is that, the second rolling surface 661a of the second pressing roller 661 defines a second impression pattern 620 different from the first impression pattern 220. The second impression pattern 620 includes a plane surface 621 and two parallel straight grooves 622. The two straight grooves 622 are defined in the plane surface 621. The structure of the third roller pressing device 690 is substantially the same as the structure of the third roller pressing device 290. The third roller pressing device 690 includes a third pressing roller 691, a third auxiliary roller 692, a third feeder 693, and a third drying element 698.

Figure 11:
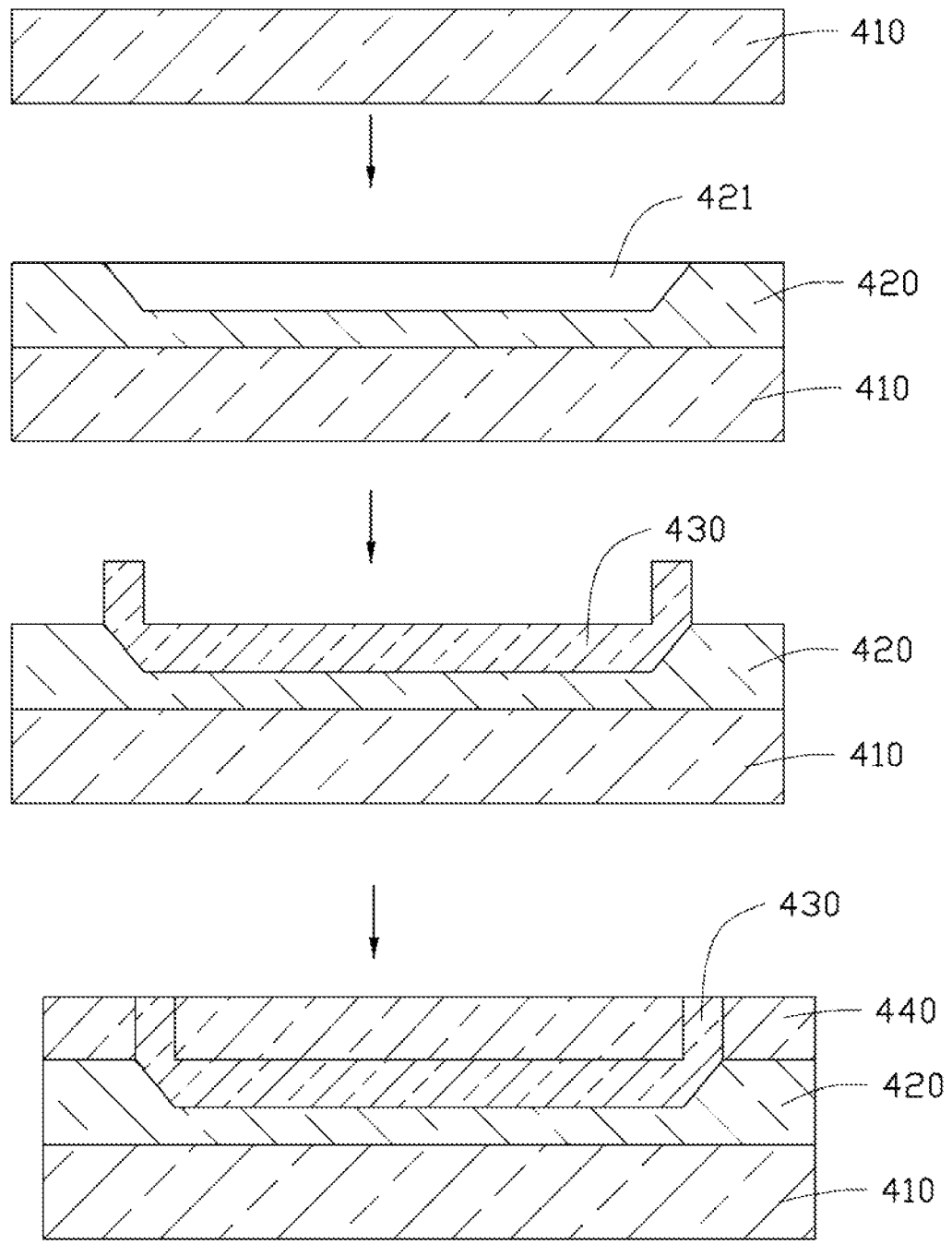
FIG. 11 is a schematic view showing successive stages of a method for manufacturing the OPCB of FIG. 7.

Referring to FIG. 11, a method for manufacturing the OPCB 400 of FIG. 8 using the apparatus 600 includes the following steps.

In step 1, the substrate 410 is provided and is cleaned.

In step 2, the first cladding layer 420 is formed on the substrate 410 using the first roller pressing device 610, and the first cladding layer 420 defines the receiving groove 421.

In step 3, the receiving grooves 421 are filled with the core layer forming solvent using the second roller pressing device 660 to form the base 431 and the two second protrusions 432 perpendicular to the base 431, and the core layer 430 is thus formed.

In step 4, the second cladding layer 440 is formed on the core layer 430 using the third roller pressing device 690, and the second cladding layer 440 defines two straight grooves 622 for receiving the two protrusions 432, and the OPCB 400 is thus obtained.

The OPCB can be manufactured using the first to third roller pressing devices, and does not need manual mounting and demounting, therefore, the manufacturing efficiency is greatly improved.

The above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An apparatus for manufacturing an optical printed circuit board (OPCB), comprising:
   a first roller pressing device, comprising:
      a first feeder configured for providing a first cladding forming solvent to a substrate;
      a first pressing roller comprising a rolling surface defining a first impression pattern, the first impression pattern comprising:
         a first molding groove having a first molding surface; and
         a protrusion positioned on the molding surface and having a first side surface, a second side surface, and a connecting surface, wherein the first side surface and the second side surface are positioned on two opposite ends of the connecting surface, an included angle of the first side surface and the connecting surface is about 135 degrees, an included angle between the second side surface and the connecting surface is about 135 degrees;
      a first auxiliary roller separating from the first pressing roller and cooperating with the first pressing roller to press the first cladding forming solvent on the substrate to obtain a first cladding solvent layer; and
      a first drying element configured for solidifying the first cladding solvent layer to obtain a first cladding layer;
   a second roller pressing device, comprising:
      a second feeder configured for providing a core layer forming solvent;
      a second pressing roller;
      a second auxiliary roller separating from the second pressing roller and cooperating with the second pressing roller to press the core forming solvent on the first cladding layer to obtain a core solvent layer; and
      a second drying element configured for solidifying the core solvent layer to obtain a core layer; and
   a third roller pressing device, comprising:
      a third feeder configured for providing a second cladding layer forming solvent;
      a third pressing roller;
      a third auxiliary roller separating from the third pressing roller and cooperating with the third pressing roller to press the second cladding forming solvent on the core layer to obtain a second cladding solvent layer; and
      a third drying element configured for solidifying the second cladding solvent layer to obtain a second cladding layer.

2. The apparatus for manufacturing OPCB of claim 1, wherein each of the first auxiliary roller, the second pressing roller, the second auxiliary roller, the third pressing roller, and the third auxiliary roller has a smooth rolling surface.

3. The apparatus for manufacturing OPCB of claim 1, wherein the second pressing roller comprises a rolling surface defining a second impression pattern, and the second impression pattern comprises a plane surface and two parallel straight grooves defining on the plane surface.

4. A method for manufacturing an OPCB, comprising:
   providing a substrate;
   forming a first cladding layer on the substrate using a first roller pressing device, the first cladding layer defining a receiving groove;
   forming a core layer in the receiving groove using a second roller pressing device; and
   forming a second cladding layer on the core layer using a third roller pressing device.

5. The method for manufacturing OPCB of claim 4, wherein the step of forming a core layer in the receiving groove comprises: forming a base in the receiving groove and forming two protrusions on the base; the step of forming a second cladding layer on the core layer further comprises: forming two straight grooves passing through the second cladding layer using the third roller pressing device, the two straight grooves receiving the two protrusions respectively.

* * * * *